3,222,320
EQUILIBRATION OF ORGANOSILOXANE
POLYMERS
Clarence J. Wolf, Kirkwood, Mo., assignor to Union
Carbide Corporation, a corporation of New York
No Drawing. Filed Oct. 16, 1961, Ser. No. 145,466
15 Claims. (Cl. 260—46.5)

This invention relates to the equilibration of organosiloxane polymers, and to an improved method for the molecular rearrangement of organosiloxane polymers.

It is known that, when an organosiloxane polymer of low molecular weight is contacted with a minor amount of mineral acid, the polymer increases in molecular weight. In order to effect such reaction, however, an elevated temperature, i.e. of the order of 100° C. or above, is usually required. Further, it is often difficult to arrest the process at the proper moment and to remove the bulk of the acid with sufficient rapidity to prevent continued polymerization. Moreover, catalyst traces are generally difficult to remove from the resulting reaction product and neutralization and extensive washing steps are often required.

It is an object of the present invention, therefore, to overcome the aforesaid prior art difficulties and provide an improved method of rearranging the molecular structure of polymers.

Another object of the present invention is to provide an improved method of further polymerizing organosiloxanes at or near ambient temperature.

Another object of the present invention is to provide a method of further polymerizing organosiloxanes employing a catalyst having thermally reversible activity.

Still another object of the present invention is to provide a method for preparing high molecular weight organosiloxane polymers substantially free of catalytic residue and from lower organosiloxane polymers.

Other objects will become apparent from the following description and appended claims.

The present invention is based on the discovery that equilibration processes of the type discussed above may be efficiently and satisfactorily conducted by employing a hydropolyhalide acid chosen from the group consisting of $(HI-I_2)$, $(HI-I_2-Br_2)$ and $(HI-Br_2)$ as a transient acid equilibration catalyst. When used in the equilibration processes of the present invention, the above hydropolyhalide acids have the characteristic of being easily removed from the reaction product by volatilization, thermally reversible activity, plus extreme activity at ambient temperatures. Further, while they become essentially inactive above about 60° C., in contrast to some of the catalysts of the prior art, they regain full catalytic activity, when cooled.

Briefly stated, the transient acid equilibration catalyst of the present invention is prepared by the reaction of hydrogen halide with halogen under anhydrous conditions. In the preparation of hydrogen triiodide, for example, such reaction:

$$HI + I_2 \rightleftharpoons HI_3$$

the equilibrium constant is from about 25 to about 400 liters/mole at 25° C. in carbon tetrachloride and about 10 liters/mole in dimethylsilicone cyclic tetramer at 25° C. The absorption spectra of hydrogen triiodide complex has a maximum at about 350 millimicrons and is known to be effectively dissociated at temperatures of about 100° C., thus indicating that the active species is $HI_3$ or its equivalent, $I_3$.

While it is essential for the process of this invention that both halogen and hydrogen halide are found in the reaction mass in contact with the organosiloxane being equilibrated, the transient catalyst of the instant invention may be initially prepared before the addition of the organosiloxane starting materials or may be prepared in situ therewith. Thus, to prepare the hydrogen triiodide for example, hydroiodic acid may be added as a reagent to iodine or the order of addition may be reversed and the iodine may be added to hydroiodic acid. For in situ preparation, hydrogen triiodide may be formed by high energy radiolysis of solutions containing iodine. The in situ formation of the hydropolyhalide acids of the present invention can be accomplished in a number of ways. These include the reaction of a silicone hydride such as heptamethylcyclotetrasiloxane with halogen, or the irradiation of a siloxane-iodine solution to form the hydrogen halide.

In the practice of this invention, the hydrogen halide-halogen reaction indicated above, and hence the concomitant equilibration action of the siloxane starting materials in contact with the hydrogen halide-halogen catalyst proceeds as soon as the siloxane starting materials and the catalyst are mixed.

In practice, the organosiloxane starting material can be contacted with the hydropolyhalide acid equilibration catalyst at temperatures of from about 0° C. to about 60° C. provided the initial mixture is in the liquid state. It has been found, however, that the preferred reaction temperatures are from about 20° C. to about 40° C. with the particularly preferred reaction temperature being 30° C. Continued heating of the reaction mixture at temperatures of 60° C. or over will shift the equilibrium of the reaction to the left thereby causing a cessation, from the reaction mixture together with lower can then be easily removed, for example, by volatilization, from the reaction mixture together with lower molecular weight organosiloxanes thereby leaving a substantially catalyst-free high molecular weight organosiloxane product.

It should be noted that a unique characteristic of the hydropolyhalide acid complex catalyst is its thermally reversible activity wherein polymerization may be (a) initiated by mixing the reaction components (b) stopped by heating to 60° C. or above, or, (c) re-initiated by cooling the mixture to the catalyst's active temperature range. The result of this characteristic is a high degree of control over the polymerization, thus allowing one to start, stop and reinitiate the reaction at will.

The temperature at which the complex will be shifted to the dissociated state will depend on such factors as the concentration of the halogen and hydrogen halide used in the present invention as well as the solvent employed, if any. Generally speaking, the complex will be completely dissociated at about 100° C., but in effect the complex is virtually non-existent above 60° C. and therefore, polymerization is negligible above such temperature.

The particular concentration of transient acid catalyst employed as catalytic amount for carrying out the polymerization varies with the siloxane being treated and also with the type of polymer desired, as will be readily apparent from the examples presented below. In general, it is preferred to employ from about 0.01 to about 4 parts by weight of the hydropolyhalide acid catalyst of the present invention per 100 parts by weight of the starting organosiloxane while it is particularly preferred to employ from about 0.1 to 1 part by weight of the catalyst per 100 parts by weight of the organosiloxane.

In the above-mentioned hydrohalide-halogen preparation of the transient acid catalyst, it is preferred to employ from about 0.1 to about 5.0 parts by weight of hydrohalide and from about 0.1 to about 5.0 parts by weight of halogen per 100 parts by weight of organosiloxane.

In the preparation of the transient catalyst by irradiation it is preferred to employ from about 0.1 to about 5.0 parts by weight of halogen per 100 parts by weight of organosiloxane. It has been found that the irradiation may be effected either prior to or after the addition of the halogen to the organosiloxane employed in the present invention. Hence a solution of the halogen in the organosiloxane may be irradiated first later addition of halogen.

The irradiation dosage depends on the amount of halogen contained in or to be added to the halogen-organosiloxane solution used in the invention. For example, effective irradiation dosage limits have been found to be between approximately ¼ megarad and 5 megarads with the preferred dosage being 1 megarad for a solution containing 0.15 part iodine per 100 parts of organosiloxane by weight. Alpha, beta, electromagnetic and the like types of radiation may be employed in the process of the present invention.

In general, the process of this invention does not require the use of an organic diluent. The conjoint use of an organic diluent with the transient acid catalyst apparently retards the rate of reaction so as to make the polymerization more readily controllable than when no diluent is employed. However, as the formation of high molecular weight long-chain organosiloxane appears to be inversely proportional to the rate of polymerization the use of an appropriate solvent, therefore, has some commensurate advantages.

As indicated previously, the polymerization rate is also dependent upon the concentration of catalyst, i.e. the reaction occurs more rapidly at higher catalyst concentrations than at lower. In this regard, the reaction appears to be governed by a 3/2 power kinetic law, i.e. the amount of polymer produced in a given time is proportional to the hydrogen triiodide catalyst concentration to the 3/2 power.

In general, any organosiloxane consisting essentially of units having the formula $$R_nSiO_{\frac{4-n}{2}} \quad (1)$$

in which R is of the group of unsubstituted or substituted monovalent hydrocarbon radicals, and $n$ has an average value of from 1 to 3 can be employed in the method of this invention. Preferably R contains from 1 to 12 carbon atoms. The groups represented by R can be the same or different in any given siloxane group or throughout the siloxane block, and the value of $n$ in the various siloxane groups in the siloxane block can be the same or different. The siloxane block has a ratio of hydrocarbon groups to silicon atoms from 1:1 to 3:1. The organosiloxane used is free of aliphatic carbon to carbon multiple bonds.

Illustrative of the unsubstituted monovalent hydrocarbon groups represented by R in Formula 1 are the linear alkyl groups (for example, the methyl, ethyl, propyl, butyl, and amyl groups), the cyclic alkyl groups (for example the cyclohexyl and cyclopentyl groups), the aryl groups (for example the phenyl and naphthyl groups), the alkaryl groups (for example the tolyl group), and the aralkyl groups (for example the benzyl and beta-phenylethyl groups).

Illustrative of the substituted monovalent hydrocarbon groups represented by R in Formula 1 are the substituted alkyl groups (for example the cyanoalkyl and the carboxyalkyl groups) and the substituted aryl groups (for example the nitrophenyl and chlorophenyl groups).

It should be understood that the organosiloxanes employed as starting materials in this invention can be linear or cyclic in structure. The linear organosiloxanes include those containing only groups represented by Formula 1 wherein $n$ is 2 (e.g., hydroxyl end-blocked dimethylpolysiloxane $(HO[(CH_3)_2SiO]_xH)$, as well as those containing only groups represented by Formula 1 wherein $n$ is 3 (e.g., hexamethyl disiloxane). The linear organosiloxanes also include those containing both groups represented by Formula 1 wherein $n$ is 2 and groups represented by Formula 1 wherein $n$ is 3 [e.g., trimethylsiloxy end-blocked dimethylpolysiloxanes, $$(CH_3)_3SiO[(CH_3)_2SiO]_xSi(CH_3)_3]$$

The cyclic organosiloxanes contain only groups represented by Formula 1 wherein $n$ is 2 (e.g., dimethylsiloxane cyclic trimer and tetramer).

It should be understood too, that the method of this invention applies equally well to the preparation of homopolymeric siloxanes and to the preparation of copolymeric siloxanes. Thus, for example, an organosiloxane of the formula $R_2SiO$ might be polymerized or a mixture of siloxanes of the formulae $RSiO_{1.5}$, $R_2SiO$ and $R_3SiO_{.5}$ can be copolymerized.

The process of this invention results in products having art recognized utility as silicone fluids, gums and elastomers. For example, using benzene solutions of hydrogen-iodide and iodine, stable linear dimethyl silicone polymers of high molecular weight have been obtained from dimethylsilicone cyclic tetramers in less than 4 hours at ambient temperatures. These gums have been used to prepare elastomers which have excellent qualities. A series of silicone fluids of excellent quality and ranging in viscosity from 50 to 50,000 cps. were also readily prepared at room temperature using the process of this invention. Typical of these fluids were linear dimethyl silicones terminated at each end thereof with trimethyl groups.

The invention and other advantages flowing therefrom may be further illustrated by the examples which follow.

The following examples (Examples 1 through 5) are illustrative of the preparation of organosiloxane polymers employing hydropolyhalide acid catalysts, with or without the initial preparation of catalyst solutions and the like.

EXAMPLE 1

Two grams of octamethylcyclotetrasiloxane were mixed with 6 milligrams of iodine and 1 cubic centimeter (S.T.P.) of hydroiodic acid gas. The reactants were completely gelled after 2 hours.

EXAMPLE 2

One milliliter of octamethylcyclotetrasiloxane was dissolved in 1 ml. of benzene. To this solution 6 mg. of iodine and 1 cc. (S.T.P.) of hydroiodic acid gas were added. Upon evaporation of the solvent a gel was observed. A similar gel was obtained when this experiment was repeated with the exception that cyclohexane was employed as the solvent.

EXAMPLE 3

1.6 grams hexaethylcyclotrisiloxane were mixed with 3 milligrams iodine and 1 cc. (S.T.P.) hydroiodic acid gas was added to the reaction mixture. Within 30 minutes the reactants had completely gelled.

EXAMPLE 4

One gram of decamethylcyclopentasiloxane was mixed with 5 milligrams of iodine and 1 cc. (S.T.P.) hydroiodic acid gas was added to the reaction mixture. Within 6 hours the mixture had completely gelled.

EXAMPLE 5

1.5 grams octamethylcyclotetrasiloxane were mixed with 5 milligrams iodine and 0.01 cc. heptamethylcyclotetrasiloxane. The mixture completely gelled within 3 hours. The above experiment was repeated using benzene and cyclohexane as solvents with gellation occurring within 3 hours. Hexaethylcyclotrisiloxane and decamethylcyclopentasiloxane were also polymerized with the mixture of iodine and heptamethylcyclotetrasiloxane in the manner indicated in the first part of the present example and the gellation occurring within 3 hours.

EXAMPLE 6

One gram of octamethylcyclotetrasiloxane was mixed with about 3.5 milligrams of iodine and irradiated with cobalt 60 gamma rays (average energy about 1.25 mev.) such that a total dosage of approximately 1 megarad was given to the sample. Substantial polymerization was found to have occurred upon standing for 2 hours. Complete gellation was found to have occurred within 16 hours.

EXAMPLE 7

Approximately 10 g. of octamethylcyclotetrasiloxane was placed in a series of tubes which were then reweighed, purged with nitrogen and capped. A catalyst solution, transferred by means of a hypodermic syringe, was introduced into each tube which was then placed in a constant temperature bath. One or more tubes were withdrawn from the constant temperature bath at various times, heated in a 150° C. oil bath and stripped under vacuum until colorless. After cooling, each tube was reweighed and the percent conversion to polymer computed. The resulting data are summarized below in Table I. As can be seen from an analysis of the data of Table I, a maximum in the rate of polymerization appears to result when a temperature of 30° C. is employed.

It is also apparent that while the rate of polymerization increases with increased catalyst concentration, this can be offset by the dilution effects of the relatively large amount of benzene (10 to 20 percent by volume) added as catalyst solvent.

Table I

THE EFFECT OF CATALYST CONCENTRATION AND TEMPERATURE ON THE CONVERSION OF DIMETHYL-SILICONE CYCLIC TETRAMER TO POLYMER

| Temp. (° C.) | Time (hr.) | p.p.t. HI | p.p.t. $I_2$ | Percent Conversion to Polymer |
|---|---|---|---|---|
| 0 | 1 | 7.39 | 10.20 | 38.7 |
| 0 | 1 | 3.97 | 10.43 | 38.7 |
| 15 | 4 | 3.95 | 9.46 | 82.5 |
|  |  | 6.25 | 9.37 | 84.8 |
|  |  | 7.68 | 9.82 | 85.2 |
|  |  | 10.11 | 10.02 | 86.1 |
| 20 | 0.5 | 4.06 | 9.93 | 12.0 |
|  |  | 6.19 | 9.52 | 6.6 |
|  |  | 7.73 | 9.62 | 10.4 |
|  |  | 9.98 | 9.99 | 10.9 |
|  | 1 | 3.97 | 9.97 | 28.2 |
|  |  | 6.25 | 9.94 | 43.4 |
|  |  | 7.79 | 9.90 | 47.3 |
|  |  | 9.90 | 10.21 | 48.8 |
|  | 4 | 3.98 | 9.76 | 81.3 |
|  |  | 5.54 | 9.74 | 86.1 |
|  |  | 7.63 | 9.64 | 84.7 |
|  |  | 9.77 | 9.77 | 83.4 |
|  | 18 | 3.92 | 9.78 | 86.6 |
|  |  | 5.94 | 9.71 | 86.4 |
|  |  | 7.68 | 10.01 | 84.3 |
|  |  | 9.95 | 9.71 | 83.7 |
| 25 | 0.5 | 4.03 | 10.39 | 8.9 |
|  |  | 5.86 | 9.74 | 17.7 |
|  |  | 7.65 | 9.77 | 24.0 |
|  |  | 10.03 | 10.01 | 37.3 |
|  | 1 | 3.83 | 11.97 | 50.9 |
|  |  | 5.78 | 10.09 | 53.0 |
|  |  | 7.34 | 9.43 | 55.3 |
|  |  | 9.24 | 9.78 | 59.5 |
|  | 4 | 4.11 | 9.90 | 87.7 |
|  |  | 6.12 | 10.17 | 84.7 |
|  |  | 8.01 | 9.95 | 86.6 |
|  |  | 9.93 | 9.97 | 84.9 |
|  | 18 | 4.02 | 10.08 | 86.3 |
|  |  | 6.15 | 10.06 | 87.2 |
|  |  | 7.94 | 10.16 | 85.4 |
|  |  | 9.66 | 10.15 | 84.5 |
| 30 | 0.5 | 3.91 | 10.01 | 13.3 |
|  |  | 6.40 | 9.75 | 18.5 |
|  |  | 8.13 | 9.83 | 16.9 |
|  |  | 9.96 | 10.08 | 32.8 |
|  | 1 | 3.97 | 10.29 | 50.2 |
|  |  | 6.21 | 9.84 | 60.3 |
|  |  | 8.21 | 9.81 | 65.5 |
|  |  | 10.07 | 10.03 | 63.1 |
|  | 4 | 3.96 | 10.15 | 85.4 |
|  |  | 6.17 | 10.08 | 85.1 |
|  |  | 7.79 | 10.24 | 82.2 |
|  |  | 9.78 | 10.23 | 83.4 |
|  | 18 | 6.25 | 9.39 | 86.7 |
|  |  | 7.70 | 9.67 | 86.1 |
|  |  | 10.32 | 9.85 | 86.5 |

Table I—Continued

| Temp. (° C.) | Time (hr.) | p.p.t. HI | p.p.t. $I_2$ | Percent Conversion to Polymer |
|---|---|---|---|---|
| 35 | 0.5 | 3.93 | 10.42 | 14.0 |
|  |  | 5.75 | 9.30 | 16.9 |
|  |  | 7.58 | 9.78 | 12.7 |
|  |  | 9.63 | 10.00 | 25.1 |
|  | 1 | 3.69 | 9.81 | 42.5 |
|  |  | 5.60 | 9.16 | 46.9 |
|  |  | 7.49 | 9.18 | 51.5 |
|  |  | 9.32 | 8.99 | 50.2 |
|  | 4 | 3.87 | 9.12 | 88.5 |
|  |  | 5.45 | 9.76 | 87.2 |
|  |  | 7.40 | 9.57 | 87.8 |
|  |  | 9.58 | 10.11 | 86.6 |
|  | 18 | 4.04 | 9.25 | 87.5 |
|  |  | 5.93 | 10.02 | 88.0 |
|  |  | 8.31 | 9.86 | 86.1 |
|  |  | 9.97 | 9.68 | 85.3 |
| 40 | 4 | 4.04 | 9.96 | 78.4 |
|  |  | 6.01 | 10.10 | 82.5 |
|  |  | 7.60 | 9.95 | 82.6 |
|  |  | 9.94 | 9.87 | 86.3 |
|  |  | 9.94 | 9.87 | 86.3 |
|  | 18 | 3.98 | 10.68 | 86.5 |
|  |  | 5.99 | 9.99 | 86.3 |
|  |  | 7.61 | 10.15 | 86.0 |
|  |  | 10.24 | 9.98 | 85.7 |
| 50 | 4 | 6.20 | 9.83 | 62.7 |
|  |  | 6.03 | 10.03 | 58.3 |
| 60 | 4 | 5.99 | 10.17 | 3.3 |
|  |  | 6.05 | 9.80 | 2.9 |
| 70 | 4 | 6.05 | 9.98 | 4.5 |
|  |  | 6.01 | 9.79 | 7.4 |
| 35 | 1 | 4.13 | 5.33 | 8.8 |
|  |  | 6.10 | 4.96 | 9.6 |
|  |  | 7.85 | 4.86 | 10.8 |
|  |  | 9.86 | 4.79 | 15.8 |
|  | 18 | 3.88 | 4.79 | 85.9 |
|  |  | 6.10 | 7.39 | 87.0 |
|  |  | 7.96 | 4.85 | 86.4 |
|  |  | 9.87 | 4.94 | 85.6 |

EXAMPLE 8

One gram samples of the organosiloxane starting materials listed in the following Table II were each mixed with 5 milligrams of iodine and 0.01 cc. heptamethylcyclotetrasiloxane. A benzene solvent was employed in each run. The observation of each reaction appears in the following Table II.

Table II

| ORGANOSILOXANE | OBSERVATION |
|---|---|
| $(Me_2SiO)_4$ | Firm gum was obtained. |
| $(Et_2SiO)_3$ | Firm gum was obtained. |
| $(Me_2SiO)_4 + [(Me_2SiO)_3(SiO_2) (Me_2SiO)_3]$ | Cross-linked gel was obtained. |
| $(Me_2SiO)_4 + (CH_3CO)_2O$ | Acetoxy endblocked fluid polymer was obtained. |
| $[(NC(CH_2)_3SiMeO)(Me_2SiO)_3]$ | An orange cross-linked gel was obtained. |
| $[NC(CH_3)_2C\ CH_2CH_2SiMeO]_x$ | Soft gum was obtained. |
| $[HOCO(CH_2)_3SiMeO]_x + (Me_2SiO)_4$ | An apparently cross-linked polymer was obtained. |
| $[(NO_2C_6H_4SiMeO)(Me_2SiO)_3]$ | A brown, dry gum was obtained. |

EXAMPLE 9

A series of tests were conducted to indicate the time necessary to reach equilibrium conversion to polymerization. The tests were conducted at 30° C. employing octamethylcyclotetrasiloxane as the siloxane starting material. Equilibrium conversion to polymerization was achieved in about 2.5 hours at a catalyst concentration of 8.5 p.p.t. HI and 10 p.p.t. $I_2$. At lower catalyst concentrations of 4 p.p.t. HI and 10 p.p.t. $I_2$ equilibrium conversion to polymerization was achieved in about 4 hours. The results of these tests were calculated and are tabulated below in Table III.

Table III

HI₃ CATALYZED EQUILIBRIUM CONVERSION OF DIMETHYLSILICONE CYCLIC TETRAMER TO POLYMER AT 30°

| Time of Polymerization (hr.) | Percent Conversion to Polymer | | |
|---|---|---|---|
| | 3.95 p.p.t. HI 9.77 p.p.t. I₂ | 7.02 p.p.t. HI 9.79 p.p.t. I₂ | 8.50 p.p.t. HI 10.40 p.p.t. I₂ |
| 1.0 | 37.1 | 51.5 | 58.4 |
| 1.5 | 61.1 | 71.4 | 79.4 |
| 2.0 | 73.3 | 81.5 | 82.9 |
| 2.5 | 79.2 | 81.1 | 84.8 |
| 3.0 | 84.9 | 87.2 | 85.2 |
| 3.5 | 86.8 | 86.7 | 84.9 |
| 4.0 | 88.9 | 87.6 | 86.1 |
| 18 | | 87.8 | |

EXAMPLE 10

Mixtures of hexamethyldisiloxane and octamethylcyclotetrasiloxane were catalyzed with 3.5 p.p.t. of iodine and 7 p.p.t. of hydrogen iodide (as benzene solutions) for 24 hours at room temperature. The brownish-purple reaction mixtures were transferred to round-bottomed flasks and purged with nitrogen at 150° C. until colorless (1–4 hours) followed by heating under vacuum (1 mm. of Hg) for about one hour. Upon cooling the fluids were filtered and weighed. Clear, water-white fluids were obtained. Data on these materials is given in Table IV, below.

Table IV

PROPERTIES OF DIMETHYLSILICONE FLUIDS PREPARED WITH HI₃ CATALYST

| | Control | 1 | 2 | 3 | 4 | 5 | 6 |
|---|---|---|---|---|---|---|---|
| Me₃SiOSiMe₃, percent | | 5.65 | 2.91 | 1.77 | 0.59 | 0.20 | 1.77 |
| Viscosity at 25° (cs.) | 364 | 46 | 109 | 233 | 2,000 | 53,300 | 256 |
| Viscosity Change after 16 hrs./200°, percent | +7.4 | +13.1 | +6.9 | +5.1 | +7.5 | −6.2 | −0.7 |
| Weight Loss after 48 hrs./200°, percent | 2.1 | 9.0 | 3.2 | 2.1 | 0.9 | 0.9 | 1.4 |
| Dielectric Constant (1 KC) | 2.76 | 2.75 | 2.74 | 2.81 | 2.74 | 2.78 | 2.75 |
| Resistivity (ohm-cm.) | 4.63×10¹⁴ | 3.43×10¹⁴ | 9.85×10¹⁴ | 7.76×10¹⁴ | 2.21×10¹⁴ | 5.08×10¹³ | 2.18×10¹⁴ |

EXAMPLE 11

Octamethylcyclotetrasiloxane (350 g.), HI solution in benzene (35.9 g., 4.98 p.p.t. as HI), and I₂ solution in benzene (8.9 g., 4.80 p.p.t. as I₂) were charged to a one liter resin kettle, which was previously purged with dry nitrogen. The resin kettle was capped and allowed to stand at ambient temperatures for 22 hours. The kettle was then placed in a constant temperature bath maintained at 150° C. and the gum-stock was stripped at about 1 mm. of Hg vacuum for about 8 hours. Approximately 275 g. (92%) of a colorless, firm dry gum-stock was obtained which showed little tendency to coalesce. The polymer had an intrinsic viscosity of 2.56 dl./g. and a number average molecular weight of 1.7 x 10⁶. It is believed that the rheological properties of these gums are due to their relatively high molecular weight. There was a 3% weight loss after 24 hours at a temperature of 250° C. thus indicating the absence of catalyst fragments in the polymer.

EXAMPLE 12

The HI₃ catalyzed gum described in Example 11 above was compounded using the following recipe:

| | Parts |
|---|---|
| Gum | 100 |
| Cab-O-Sil M-5 (finely divided silica) | 40 |
| Ethoxy endblocked dimethyl polysiloxane fluid containing about 12% ethoxy groups | 10 |
| Iron oxide | 2 |
| 50% benzoyl peroxide paste | 4 |

The compound was stored for 4 days prior to curing. The mold and postcured properties of the compound are given below in Table V.

Table V

| | Mold Cured 20 min—250° C. | Postcured | |
|---|---|---|---|
| | | 24 Hrs.—250° C. | 1 wk—250° C. |
| Hardness (Shore A) | 33 | 51 | 60 |
| Tensile (p.s.i.) | 1660 | 1030 | 960 |
| Elongation (percent) | 800 | 390 | 240 |
| Tear (die C, p.i.) | 100 | 70 | 70 |
| Set at break (percent) | 10 | 0 | 0 |

EXAMPLE 13

In an effort to contrast the distinction between the hydrogen triiodide catalyst of this invention and acid catalysts of the prior art, octamethylcyclotetrasiloxane was treated with hydroiodic acid at room temperature, at elevated temperature and at room temperature in the presence of an intense light source. After 120 hours, polymerization was only partial, whereas, the addition of a few tenths percent iodine to the same concentration of HI and silicone tetramer effected polymerization of the tetramer, at 35° C. within a fraction of one hour. The results of the tests are specifically indicated in *a, b,* and *c* below.

(*a*) To one gram octamethylcyclotetrasiloxane one cc. (S.T.P.) of hydroiodic acid gas was added. The system was only partially polymerized after one week at room temperature.

(*b*) To one gram octamethylcyclotetrasiloxane, one cc. (S.T.P.) of hydroiodic acid gas was added and the solution was heated to 110° C. After one week at 110° C., the solution was only partially polymerized.

(*c*) To one gram of octamethylcyclotetrasiloxane, 1 cc. (S.T.P.) of hydroiodic acid gas was added and the solution was irradiated with a tungsten photoflood lamp at a distance of several inches. After 120 hours, the system was polymerized.

EXAMPLE 14

A. *Experimental (N.B. S-1025-67, 77, 78, 91)*

One gram samples of dimethylsilicone cyclic tetramer were placed in test tubes and saturated with the hydrohalide gas, halogen in amounts of 1.2 parts/100 of tetramer by weight was added, the test tubes stoppered, and the rates of polymerization followed visually over a period of 24 to 48 hours.

The relative polymerization rates of the hydrohalide and hydropolyhalide acids are summarized as follows:

$$(HI-I_2) > (HI-I_2Br_2) > (HI-Br_2) \gg (HI)$$

The catalysts at the beginning of the order (HI—I₂) gave firm, hard gums in about 0.5 to 1 hour at room temperature, but the HI catalyst at the end of the series, produced mobile liquids even after 48 hours.

What is claimed is:

1. The process which comprises contacting an organosiloxane polymer consisting essentially of units having the formula:

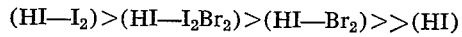

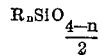

wherein R is a member selected from the group consisting of unsubstituted monovalent hydrocarbon radicals free of aliphatic carbon to carbon multiple bonds, and substituted monovalent hydrocarbon radicals free of aliphatic carbon to carbon multiple bonds, each substituent being a member selected from a group consisting of the cyano, carboxy, nitro and chloro groups and $n$ has an average value of from 1 to 3 with a catalytic amount of a hydropolyhalide acid chosen from the group consisting of (HI—I$_2$), (HI—I$_2$—Br$_2$) and (HI—Br$_2$) at a reaction temperature of between 0° C. and 60° C. to effect rearrangement of the molecular structure of the organosiloxane polymer.

2. The process according to claim 1 in which the equilibration is carried out in an organic diluent.

3. The process according to claim 1, in which the equilibration is carried out at a temperature of from 20° to 40° C.

4. The process according to claim 1, in which the equilibration is carried out at a temperature of about 30° C.

5. The process of claim 1 wherein the hydropolyhalide is HI$_3$ and the organosiloxane polymer is a cyclic dimethylpolysiloxane.

6. The process of claim 1 wherein the hydropolyhalide is HI$_3$ and wherein the organosiloxane polymer is hexamethylcyclotrisiloxane.

7. The process of claim 1 wherein the hydropolyhalide is HI$_3$ and wherein the organosiloxane polymer is hexaethylcyclotrisiloxane.

8. The process of claim 1 wherein the hydropolyhalide is HI$_3$ and wherein the organosiloxane polymer is octamethylcyclotetrasiloxane.

9. The process of claim 1 wherein the hydropolyhalide is HI$_3$ and wherein the organosiloxane polymer is decamethylcyclopentasiloxane.

10. The process which comprises contacting an organosiloxane polymer consisting essentially of units having the formula:

$$R_nSiO_{\frac{4-n}{2}}$$

wherein R is a member selected from the group consisting of unsubstituted monovalent hydrocarbon radicals free of aliphatic carbon to carbon multiple bonds, and substituted monovalent hydrocarbon radicals free of aliphatic carbon to carbon multiple bonds, each substituent being a member selected from a group consisting of the cyano, carboxy, nitro and chloro groups and $n$ has an average value of from 1 to 3 with from 0.01 to 4 parts by weight of hydropolyhalide chosen from the group consisting of (HI—I$_2$), (HI—I$_2$—Br$_2$) and (HI—Br$_2$) per 100 parts by weight of the organosiloxane polymer at a reaction temperature of between 0° and 60° C. and recovering an organosiloxane polymer having a molecular structure different than that initially employed.

11. The process according to claim 10 in which the organosiloxane polymer is contacted with from 0.1 to 1 part by weight of hydrogen triiodide catalyst per 100 parts by weight of the organosiloxane polymer.

12. The process which comprises contacting an organosiloxane polymer consisting essentially of units having the formula:

$$R_nSiO_{\frac{4-n}{2}}$$

wherein R is a member selected from the group consisting of unsubstituted monovalent hydrocarbon radicals free of aliphatic carbon to carbon multiple bonds, and substituted monovalent hydrocarbon radicals free of aliphatic carbon to carbon multiple bonds, each substituent being a member selected from a group consisting of the cyano, carboxy, nitro and chloro groups and $n$ has an average value of from 1 to 3 with from about 0.1 to about 5 parts by weight of iodine per 100 parts by weight of the organosiloxane polymer adding thereto from about 0.1 to about 5 parts by weight of hydrogen iodide per 100 parts by weight of the organosiloxane polymer at a temperature of from 0° to 60° C. whereby the organosiloxane polymer is caused to react with formation of an organosiloxane polymer having a rearranged molecular structure.

13. The process which comprises contacting an organosiloxane polymer consisting essentially of units having the formula:

$$R_nSiO_{\frac{4-n}{2}}$$

wherein R is a member selected from the group consisting of unsubstituted monovalent hydrocarbon radicals free of aliphatic carbon to carbon multiple bonds and substituted monovalent hydrocarbon radicals free of aliphatic carbon to carbon multiple bonds, each substituent being a member selected from a group consisting of the cyano, carboxy, nitro and chloro groups and $n$ has an average value of from 1 to 3, with from about 0.1 to about 5 parts by weight of hydrogen iodide per 100 parts by weight of the organosiloxane polymer adding thereto from about 0.1 to about 5 parts by weight of iodine per 100 parts by weight of the organosiloxane polymer at a temperature of from 0° C. to 60° C. whereby the organosiloxane polymer is caused to react with formation of an organosiloxane polymer having a rearranged molecular structure.

14. The process which comprises contacting an organosiloxane polymer consisting essentially of units having the formula:

$$R_nSiO_{\frac{4-n}{2}}$$

wherein R is a member selected from the group consisting of unsubstituted monovalent hydrocarbon radicals free of aliphatic carbon to carbon multiple bonds, and substituted monovalent hydrocarbon radicals free of aliphatic carbon to carbon multiple bonds, each substituent being a member selected from a group consisting of the cyano, carboxy, nitro and chloro groups and $n$ has an average value of from 1 to 3 with from about 0.1 to 5 parts by weight of iodine per 100 parts by weight of organosiloxane polymer subjecting said mixture to radiation of the order of from ¼ to 4 megarads whereby the organosiloxane polymer is caused to react with formation of an organosiloxane polymer having a rearranged molecular structure.

15. The process which comprises contacting an organosiloxane polymer consisting essentially of units having the formula:

$$R_nSiO_{\frac{4-n}{2}}$$

wherein R is a member selected from the group consisting of unsubstituted monovalent hydrocarbon radicals free of aliphatic carbon to carbon multiple bonds, and substituted monovalent hydrocarbon radicals free of aliphatic carbon to carbon multiple bonds, each substituent being a member selected from a group consisting of the cyano, carboxy, nitro and chloro groups and $n$ has an average value of from 1 to 3 with from about 0.1 to 5 parts by weight of iodine, per 100 parts by weight of organosiloxane polymer and from about 0.1 to 5 parts by weight of a silicone hydride per 100 parts by weight of organosiloxane polymer at a temperature of from 0° to 60° C. whereby the organosiloxane polymer is caused to react with formation of an organosiloxane polymer having a rearranged molecular structure.

(References on following page)

References Cited by the Examiner

UNITED STATES PATENTS

| | | | |
|---|---|---|---|
| 2,441,422 | 5/1948 | Krieble et al. | 260—448.8 |
| 2,441,423 | 5/1948 | Elliott et al. | 260—448.8 |
| 2,467,976 | 4/1949 | Hyde | 260—46.5 |
| 2,643,240 | 6/1953 | Walton et al. | 260—46.5 |
| 2,994,684 | 8/1961 | Johannson | 260—46.5 |
| 3,002,951 | 10/1961 | Johannson | 260—46.5 |

OTHER REFERENCES

Dodgen et al.: Journal of Chemical Physics, vol. 17, No. 10, October 1949, pp. 951–957.

Conant et al.: The Chemistry of Organic Compounds, 5th edition (1959), Macmillan Co., New York, pages 37 and 38 relied on.

LEON J. BERCOVITZ, *Primary Examiner*.

J. R. LIBERMAN, WILLIAM H. SHORT, *Examiners*.